United States Patent [19]

Hsu

[11] Patent Number: 5,486,100
[45] Date of Patent: * Jan. 23, 1996

[54] PASTA MAKER WITH DUAL KNEADING BLADES

[75] Inventor: Maxwell Hsu, Taipei, Taiwan

[73] Assignee: Airlux Electrical Co., Ltd., Taipei, Taiwan

[*] Notice: The portion of the term of this patent subsequent to Mar. 28, 2012, has been disclaimed.

[21] Appl. No.: 242,413

[22] Filed: May 13, 1994

Related U.S. Application Data

[63] Continuation-in-part of Ser. No. 182,000, Jan. 14, 1994, Pat. No. 5,401,159.

[51] Int. Cl.$^6$ .................................. B29B 1/06; B01F 7/18
[52] U.S. Cl. ........................... 425/190; 99/353; 99/348; 366/98; 366/309; 366/314; 425/197; 425/205
[58] Field of Search .......................... 99/348, 352, 353, 99/357, 407, 484; 366/97, 98, 69, 205, 314, 77, 80, 91, 99, 309, 311; 425/190, 197, 205

[56] References Cited

U.S. PATENT DOCUMENTS

| | | | |
|---|---|---|---|
| 2,456,981 | 12/1948 | Monath | 99/348 |
| 2,755,900 | 7/1956 | Seyfried | 366/205 |
| 3,345,043 | 10/1967 | Bovagne | 366/314 |
| 3,963,220 | 6/1976 | Ohchi | 366/98 |
| 4,101,279 | 7/1978 | Aslam | 366/314 |
| 4,219,318 | 8/1980 | Cavalli | 425/190 |
| 4,410,280 | 10/1983 | Yamauchi et al. | 366/314 |
| 4,878,627 | 11/1989 | Otto | 99/348 |
| 4,903,587 | 2/1990 | Nagasaka et al. | 99/352 |
| 4,913,555 | 4/1990 | Maeda et al. | 366/205 |
| 5,048,402 | 9/1991 | Letournel et al. | 99/348 |

Primary Examiner—Timothy F. Simone
Attorney, Agent, or Firm—Fields, Lewis & Rost

[57] ABSTRACT

The apparatus of this invention includes a container for holding paste ingredients, a mixing and kneading assembly for preparing the food paste within the container, and an extrusion system for pressing the paste into a desired noodle shape. The mixing and kneading assembly comprises a plurality of mixing blades attached to a centrally located cylinder within the container. In a first embodiment, the assembly further includes a scraper blade and a kneading blade. The scraper blade is fixed at a constant distance from the bottom wall of the container such that paste is scraped from to the bottom wall as the scraper blade is spun. In a second embodiment, the assembly further includes a plurality of kneading blades without a scraper blade. In both embodiments, the kneading blades each have a leading and trail edge that remain substantially parallel to the bottom wall of the container. The mixing blades and kneading blades are reciprocated in a vertical direction and are biased by a biasing means toward the bottom wall of the container. A drive means rotates a spindle which in turn spins the mixing and kneading assembly. An extrusion screw is also driven by the drive means such that paste is forced through extrusion dies, thus creating the desired pasta noodle shape. An extrusion chamber is removable from an extrusion housing for easy cleaning.

13 Claims, 4 Drawing Sheets

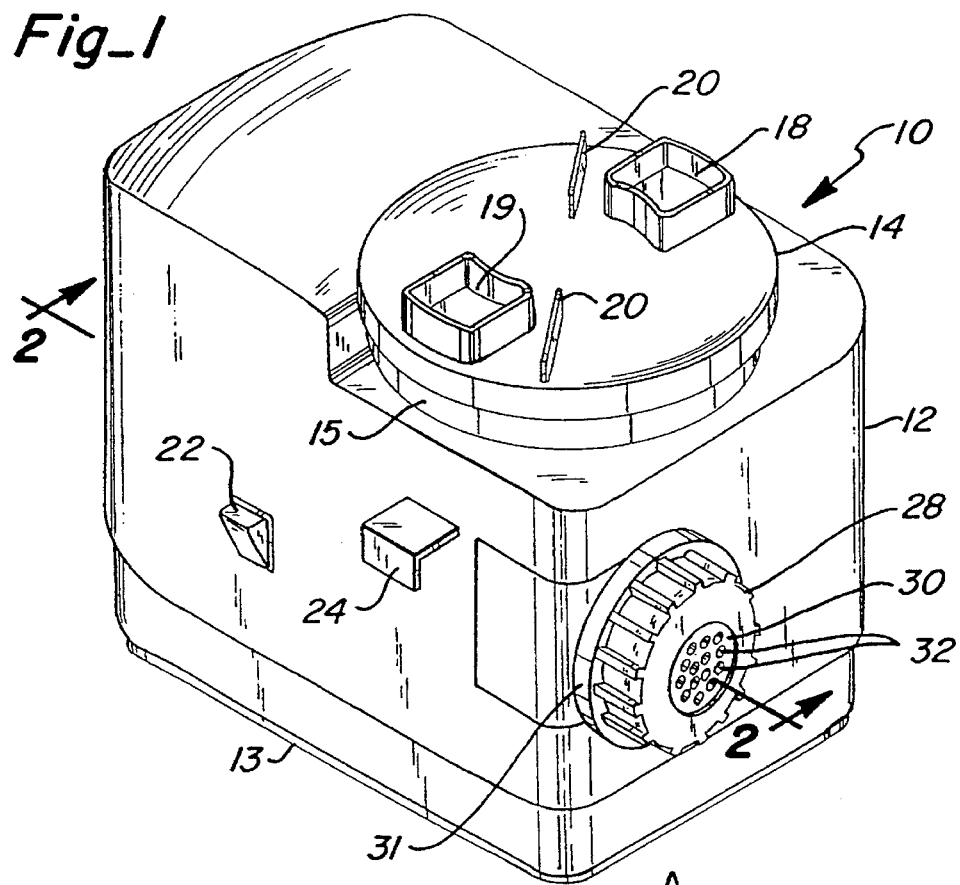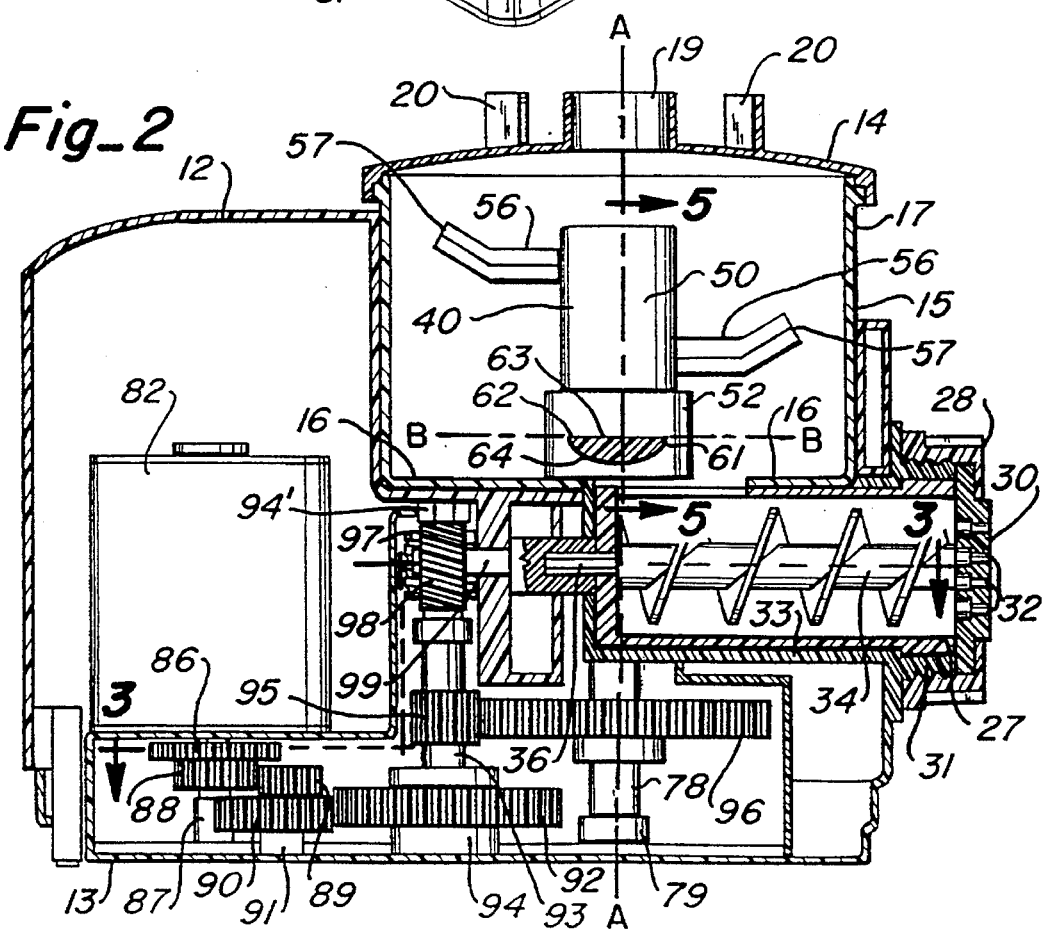

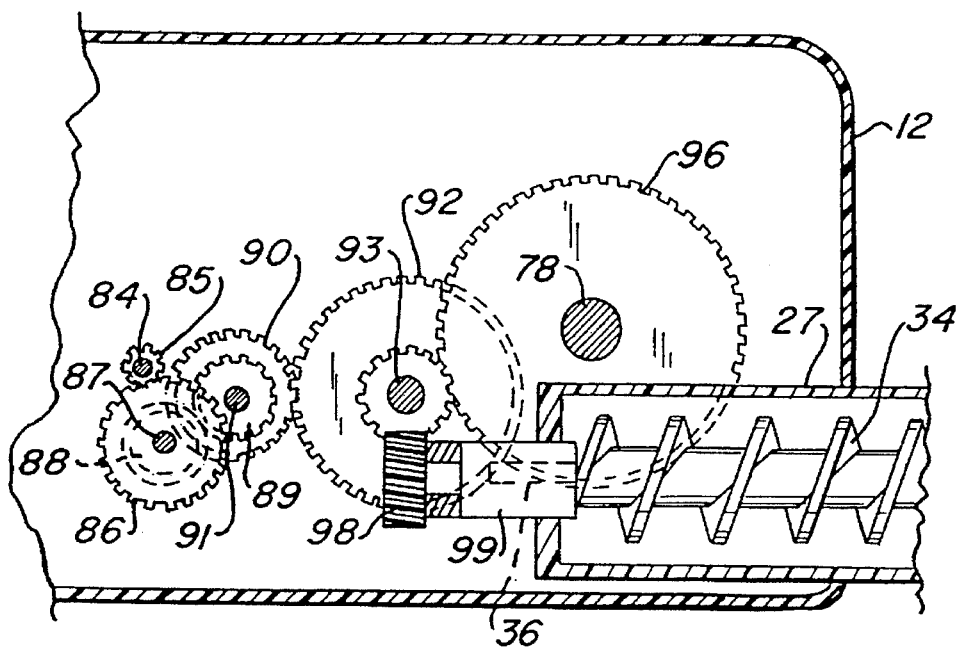
Fig_3
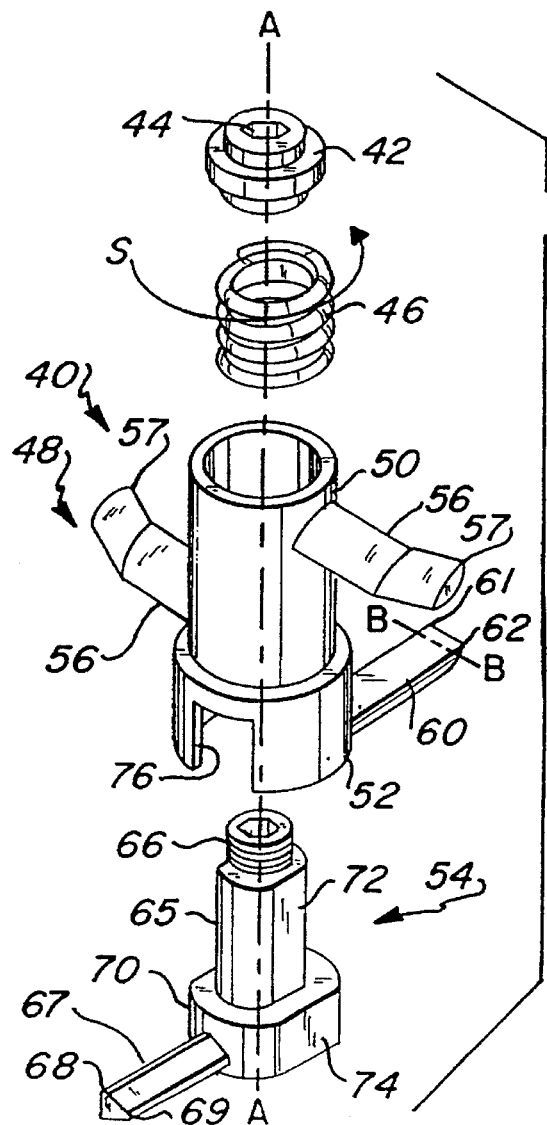
Fig_4
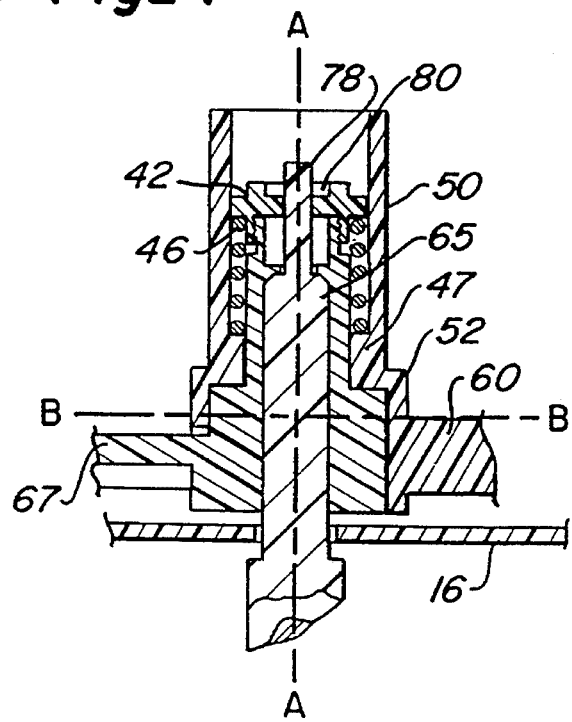
Fig_5

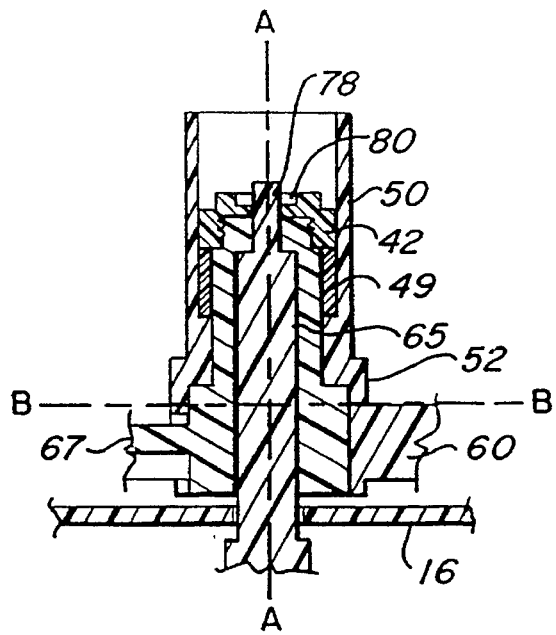
*Fig_6*
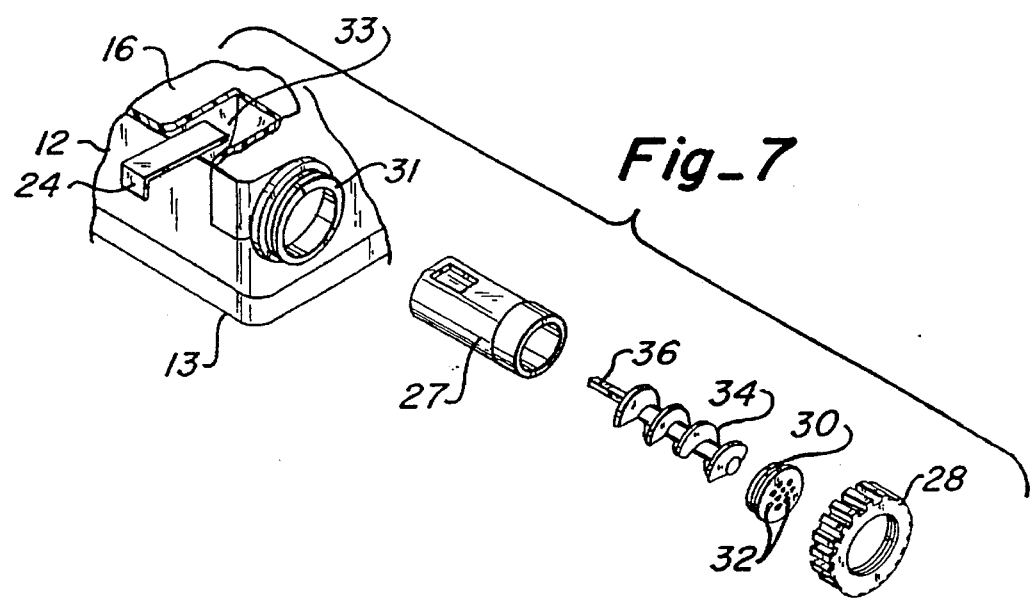
*Fig_7*
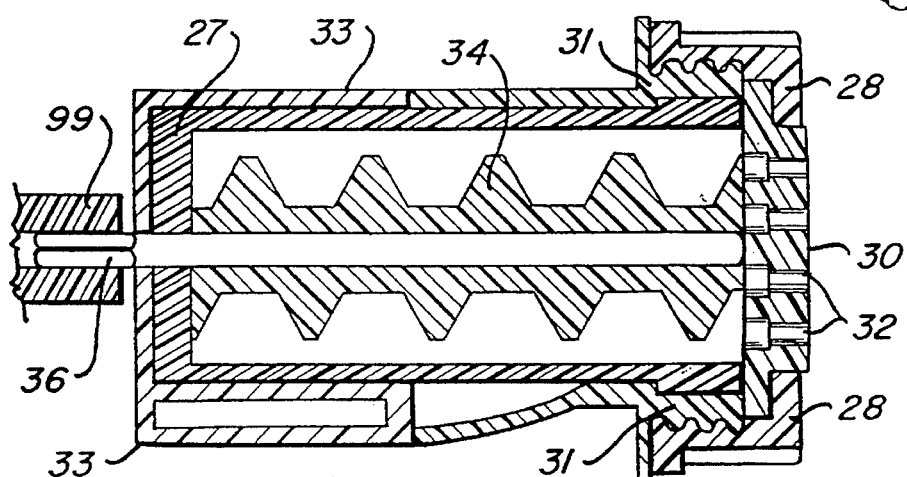
*Fig_8*

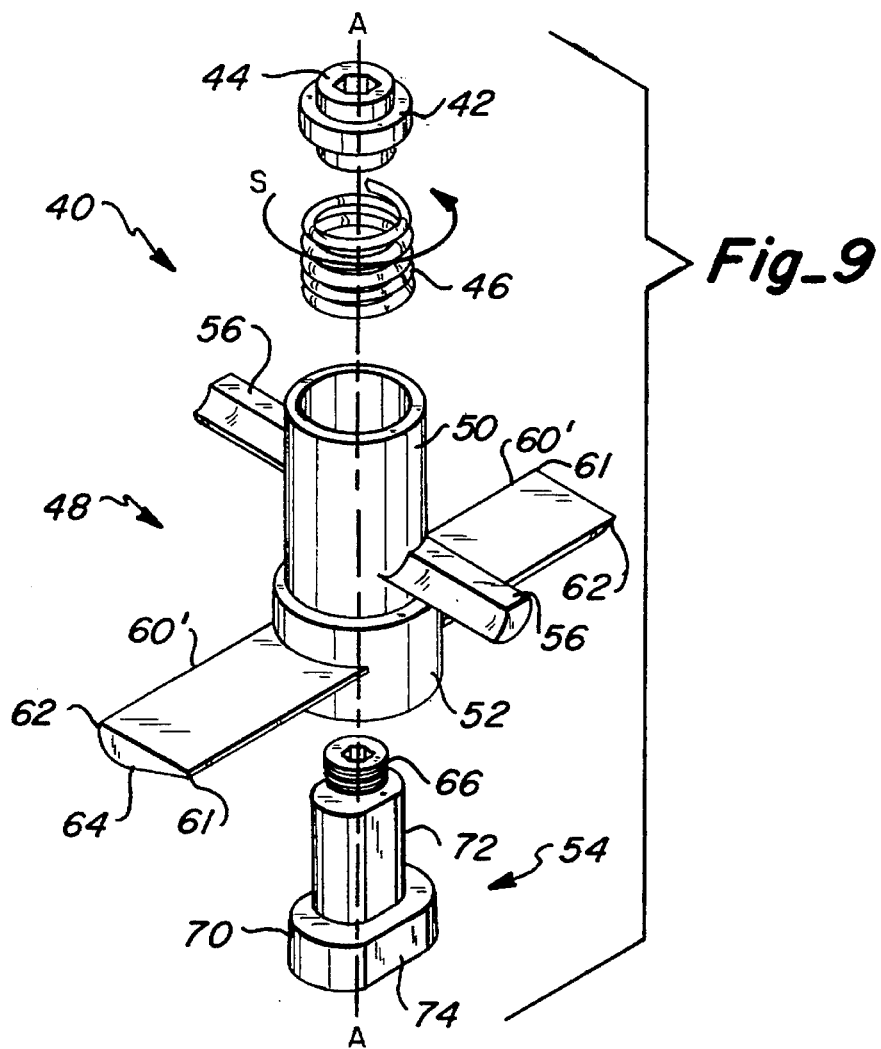
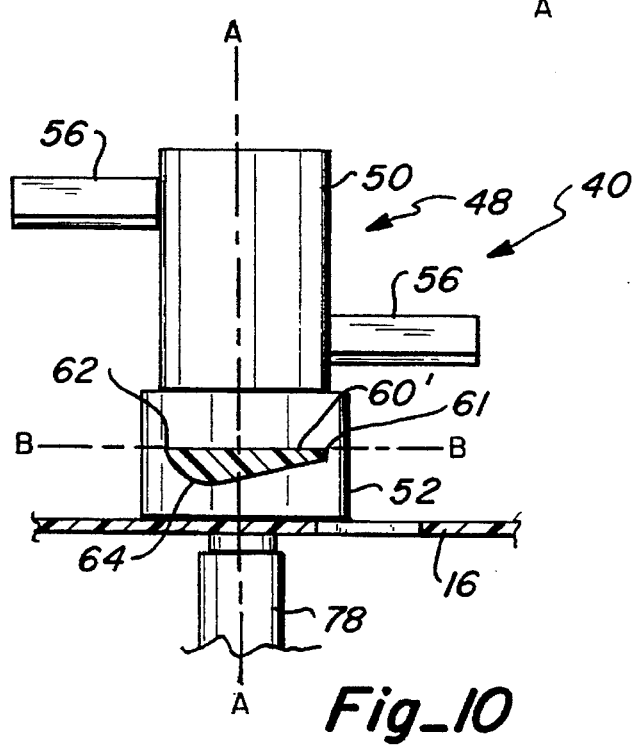

PASTA MAKER WITH DUAL KNEADING BLADES

This application is a continuation-in-part of my application U.S. Ser. No. 08/182,000 entitled "Improved Pasta Maker", filed Jan. 14, 1994, now U.S. Pat. No. 5,401,159.

TECHNICAL FIELD

This invention relates to an apparatus used for the preparation of food pastes and in particular to a device for the mixing, kneading and extrusion of pasta paste.

BACKGROUND ART

In order to produce farinaceous pastes such as those used for various types of pasta, intense mixing and kneading are necessary to create correct paste homogeneity. Because farinaceous paste is denser than other paste such as used in breads or cakes, devices to mix and knead farinaceous paste were specifically designed to overcome obstacles associated with the need for intense mixing and kneading. For example, the high torque necessary to drive mixing shafts was overcome by utilizing larger motors, and the process of kneading was simplified by adding a kneading blade to the mixing shaft. Furthermore, the process of extruding the paste into pasta noodles has been combined with the same apparatus used for mixing and kneading. One common characteristic of machines capable of mixing, kneading and extruding is that such machines have ordinarily been designed for use at the industrial level for production of large volumes of food pastes.

In recent years there has been an increased demand for smaller scale devices having the ability to make farinaceous pastes within the home. Such devices must substantially depart from previous methods because it is well known that large and bulky industrial devices cannot be used in the average domestic kitchen. It is one object of this invention to provide a simple yet effective means for producing smaller volumes of pasta or other food pastes within the constraints of a common domestic kitchen. It is yet another object to provide an apparatus which can simultaneously mix, knead, and extrude the food paste into the desired pasta shape. It is another object to provide for an apparatus in which mixing and kneading can occur at continually varying levels within a container having food paste.

U.S. Pat. No. 4,219,318 to Cavalli discloses a pasta making machine usable in the home. This invention employs the use of a plurality of mixing blades, a scraper blade, and a kneading blade in which all said blades are attached to a central shaft which rotates within a container. This invention makes use of a biasing means on the kneading blade to maintain pressure on the food paste such that the paste is kneaded to the correct homogeneity. The biasing means biases only the kneading blade while the remaining elements remain in fixed relation to a bottom wall of the container. The kneading blade is designed such that the trailing blade edge is positioned at a closer distance to the bottom wall of the container than that of the leading blade edge. Once the paste is mixed and kneaded, it is transferred to an extrusion chamber whereby an extrusion screw pushes the paste through a set of dies having the cross sectional shape of the desired pasta noodle.

While the prior art may be useful for its intended purpose, the art is absent of any device for home use in which mixing and kneading can take place at variable levels within a container due to a vertical biasing of both mixing and kneading blades. Furthermore, the prior art is absent of any device in which the kneading blade can achieve proper kneading action without having to mount the blade such that the trail and leading edges of the blade are positioned at varying distances from the bottom wall of the mixing container.

DISCLOSURE OF THE INVENTION

Accordingly, the present invention comprises an apparatus for preparing food paste such as farinaceous paste wherein small volumes can be prepared for domestic use. The apparatus includes a container which holds the food paste to be processed. The container includes a circular bottom wall, an open top side and a cylindrical side wall perpendicular to and integral with the bottom wall. Within the interior of the container is a centrally located mixing and kneading assembly having a movable part and stationary part. Both parts are placed over a spindle which is rotated by a drive means having adequate torque to spin the mixing and kneading assembly, thus overcoming the dense farinaceous paste. The spindle defines a vertical axis which serves as a reference line in describing the configuration of the apparatus elements.

Attached to the movable part of the mixing and kneading assembly in a first embodiment is a plurality of mixing blades and a single kneading blade which extend in a radial direction away from the vertical axis. Typically, the mixing blades are vertically and radially spaced along a cylinder of the movable part. The mixing blades may be configured in any spacial relationship to effect the needed mixing. The kneading blade has a leading edge and a trail edge that are substantially parallel to the bottom surface of the container. Kneading is achieved by the unique configuration of the bottom side of the blade. Typically, the bottom side of the kneading blade is of a convex configuration such that as the kneading blade is spun, the convex portion acts to compress and pull the paste thus achieving proper kneading action. The convexity of the bottom side may be altered in any geometric configuration to achieve the desired kneading action. An increase in the convexity of the bottom side of the blade results in more effective kneading action.

In a second embodiment, instead of a single kneading blade, a pair of opposing kneading blades are used. In this second embodiment, both blades have the same general shape as the single kneading blade embodiment and are attached to the movable part as set forth above. The advantages of using two kneading blades are that increased kneading action is possible and balance of rotation is provided to help eliminate undesirable vibration.

In the first embodiment, attached to the fixed part of the mixing and kneading assembly is a scraper blade which extends in a radial direction away from the vertical axis. The scraper blade has a trailing edge which is positioned in close proximity with the bottom wall of the container such that paste is prevented from adhering to the bottom wall of the container as the scraper blade is spun. In the second embodiment, the dual kneading blades, in addition to providing the proper kneading action, also perform the same function as the scraper blade in the first embodiment which is to prevent paste from adhering to the bottom wall.

In both the first and second embodiments, mounted over the spindle and between the movable part and stationary part is a biasing means in which the entire movable part may be vertically displaced along the vertical axis. The biasing means maintains a force on the movable part such that the movable part is urged toward the bottom wall. When an obstruction such as a lump of paste falls to the bottom wall of the container, the kneading blades makes contact with the obstruction, such that some paste will fall below the bottom surface of the blade thus creating an upward force in the opposite direction of the biasing means. As the kneading blades continues to spin, the lump will be compressed and pulled apart. If the upward force is greater than the downward force of the biasing means, the movable part will be pushed upward along the spindle. As farinaceous paste is mixed and kneaded, the movable part will continuously experience varying displacement along the spindle in the vertical direction depending upon the size and density of the paste lump encountered. This cyclical up and down movement is advantageous to mixing because the blades continuously strike the paste at varying levels within the container. Accordingly, the paste is more efficiently mixed and stratification is minimized in the early stages of mixing in comparison to devices in which mixing takes place at a constant level.

While the movable part is displaceable along the vertical axis, the stationary part remains fixed in spacial relationship with the bottom wall of the container. In the first embodiment, this relationship is necessary to ensure the scraper blade continuously removes any paste adhering to the bottom wall of the container. In the second embodiment, the fixed spacial relationship is not as important because the dual action of the kneading blades provides a more constant pulling and lifting force that prevents paste from adhering to the bottom wall.

While the up and down movement may be advantageous for mixing in most applications, it may be desired to mix at a constant level. Accordingly, this invention contemplates other embodiments which can either accommodate mixing at a constant level wherein the movable part and the stationary part are held in fixed vertical relation to each other, or at varying levels due to a biasing means.

Once adequate mixing and kneading has taken place, the paste is transferred to an extrusion chamber by opening a shutter slide integral with the bottom wall of the container that causes the paste to be fed by gravity force into the chamber. The convex bottom side of the kneading blades further assists transfer of the paste by pushing the paste down into the extrusion chamber. A screw-type extrusion screw then forces the paste in the chamber through extrusion dies having the desired cross sectional shape to form the desired pasta noodle.

BRIEF DESCRIPTION OF THE DRAWINGS

FIG. 1 is a perspective view of the first embodiment of the present invention wherein a single kneading blade is used;

FIG. 2 is a partial horizontal cross sectional view of the embodiment in FIG. 1 taken along line 2—2 of FIG. 1;

FIG. 3 is a horizontal offset cross-sectional view of the drive means used to rotate the extrusion screw and mixing and kneading assembly taken along offset line 3—3 of FIG. 2;

FIG. 4 is an exploded perspective view of a disassembled mixing and kneading assembly of the first embodiment;

FIG. 5 is a cross-sectional view of a movable mixing and kneading assembly taken along line 5—5 of FIG. 2;

FIG. 6 is a cross-sectional view of an immovable mixing and kneading assembly taken along line 5—5 of FIG. 2;

FIG. 7 is a fragmentary, exploded, perspective view of the elements of the extrusion system;

FIG. 8 is an enlarged cross sectional view of the extrusion system shown in FIG. 2;

FIG. 9 is an exploded perspective view of a second embodiment of a disassembled mixing and kneading assembly having a pair of opposing kneading blades; and FIG. 10 is a front view of the second embodiment showing the cross-sectional shape of one kneading blade.

BEST MODE FOR CARRYING OUT THE INVENTION

FIG. 1 shows an improved pasta maker 10, according to the present invention. The pasta maker 10 includes a housing 12 and base 13 which constitute the outer surface of the pasta maker 10. A cylindrical shaped container 15 is used to hold the pasta ingredients during the mixing and kneading process. The top portion of the container 15 is shown protruding above the housing 12 with the remaining portion of the container 15 hidden inside the housing 12. A top cover 14 is used to cover the top side of the container 15. The top cover 14 includes a first opening 18 and second opening 19 that can be used as entry points for the addition of pasta ingredients into the container 15. The openings 18 and 19 may include shutter type closure elements in order to completely seal the added ingredients from the environment. Conveniently, two cover removal assists 20 are provided to enhance gripping for removal or placement of the top cover 14. Threads on the interior edge of the top cover 14 allow the top cover 14 to be securely fastened to matching threads on the upper exterior of the container 15. An on-off switch 22 is provided on one side of the housing 12 enabling a user to operate the pasta maker.

Referring to FIG. 2, the container 15 includes a circular bottom wall 16, an open top side and a cylindrical shaped side wall 17 perpendicular to and integral with the bottom wall 16.

As shown in FIGS. 1, 7 and 8, the extrusion system 26 includes an extrusion chamber 27 that fits snugly into extrusion housing 33 through extrusion port 31. The extrusion chamber 27 is slidably received in extrusion housing 33 so that it can be removed easily for cleaning. The extrusion screw 34 is placed inside the chamber 27 wherein the horizontal extrusion shaft 36 is keyed with extrusion coupling 99 of FIG. 3. The extrusion disc 30 is held against the face of extrusion port 31 by extrusion nut 28. The extrusion disc 30 has a plurality of extrusion openings 32. The openings 32 are configured in the desired cross sectional shape of the pasta to be extruded. The pasta exits the pasta maker 10 through the extrusion openings 32. The shutter slide 24 is provided to selectively seal the container 15 from the extrusion chamber 27 or to provide entry from the container 15 through the extrusion hole 29 of FIG. 2 to the extrusion chamber 27.

Referring now to FIG. 2 and FIG. 4 according to a first embodiment, inside the container 15 is found a mixing and kneading assembly 40. The assembly 40 comprises two primary components, the movable part 48 and the stationary part 54. The movable part 48 includes a first cylinder 50 and a second cylinder 52 attached to the first cylinder 50 at its lower end. The cylinders 50 and 52 are attached such that they are in axial alignment along a vertical axis A—A. A plurality of mixing blades 56 are fixed to the first cylinder 50 wherein the blades 56 extend perpendicular to the first cylinder 50 and radially outward from vertical axis A—A. The blades 56 may be canted at a desired horizontal angle to achieve proper mixing.

As shown in FIG. 4, the mixing blades are of a triangular type cross sectional shape with the distal end 57 of the blades 56 slightly upturned. It will be understood that any number of mixing blades 56 and any spacial arrangements of such blades may be utilized to achieve desired mixing. Additionally, the cross sectional shape of the blades 56 may be varied to achieve the desired mixing. A single kneading blade 60 is attached to the second cylinder such that the blade 60 extends perpendicular to second cylinder 52 and radially outward from axis A—A. The kneading blade 60 has axis B—B through leading edge 61 and trailing edge 62 in which axis B—B is substantially parallel with the bottom wall 16 of the container 15. The kneading blade 60 has a substantially flat top surface 63 and a convex bottom surface 64, as best shown in FIG. 2. The convexity of the bottom surface 64 may be configured to achieve the desired kneading action. The stationary part 54 includes a shaft 65 attached to base section 70 such that the shaft 65 and base section 70 are aligned along axis A—A. A flat 72 and flat 74 are found on the shaft 65 and base section 70, respectively and extend parallel with axis A—A. A scraper blade 67 is attached to and extends perpendicular to base 70 and radially outward from axis A—A. The trailing edge 68 of scraper blade 67 may be canted downwards such that it comes in closer proximity than the leading edge 69 with the bottom wall 16 of the container 15.

As the mixing and kneading assembly 40 is spun in direction S, the scraper blade 67 removes pasta material which may have fallen and adhered to the bottom wall 16 of container 15. To assemble the assembly 40, a spring 46 is placed over the shaft 65 so that the lower end of spring 46 rests against stop 47 formed around the inside of cylinder 50, as shown. The movable part 48 is then placed over the stationary part 54 such that the flats 72 and 74 are aligned with corresponding interior flats found inside cylinders 50 and 52. A cutout 76 fits over scraper blade 67. At the top end of the shaft 65 are threads 66 that engage a fixing nut 44. The fixing nut 44 secures the movable part 48 to the stationary part 54 whereby the spring 46 serves to cause the movable part 48 freedom of movement in an up or down direction along axis A—A.

Referring to FIGS. 2 and 3, the drive means includes a drive Motor 82 that turns main drive shaft 84. Main drive shaft 84 has a rigidly attached drive gear 85 that drives as a first gear 86. First gear 86 is fixed to and supported by first support shaft 87. First gear 86 is stacked on top of and rigidly connected to second gear 88. Second gear 88 in turn drives third gear 89. Third gear 89 is stacked on top of and rigidly connected to fourth gear 90. Fourth gear 90 is fixed to and supported by second support shaft 91. Fourth gear 90 drives fifth gear 92. Fifth gear 92 is fixed to secondary drive shaft 93. Secondary drive shaft 93 is journaled at the bottom in gear bushing 94 and at the top in gear bushing 94'. The middle section of shaft 93 has secondary drive gear 95 which engages spindle gear 96. The spindle 78 is rigidly attached to spindle gear 96 such that rotation of gear 96 causes the spindle 78 to rotate. The upper end of shaft 93 has a rigidly attached worm gear 97. Worm gear 97 contacts helical gear 98 that is fixed to extrusion coupling 99. The rotation of shaft 93 causes the worm gear 97 to engage helical gear 98 and thus turn extrusion coupling 99. The coupling 99 is keyed and aligned with horizontal extrusion shaft 36 causing the extrusion screw 34 to spin. The screw type configuration of extrusion screw 34 causes paste in the extrusion chamber 27 to be forced through the extruder openings 32.

Referring to FIG. 5, which illustrates the first embodiment, the mixing and kneading assembly 40 is placed over spindle 78 and secured to the spindle 78 by spindle nut 80. The spindle 78 defines axis A—A and protrudes through the center of the bottom wall 16 of container 15. The spindle 78 extends downward through the container 15 into the interior of the pasta maker 10 and terminates at spindle bushing 79 located on the interior side of base 13.

According to the first embodiment, FIG. 5 and FIG. 6 illustrate cross-sectional views of the mixing and kneading assembly 40. In FIG. 5, the assembly 40 utilizes spring 46 to bias the movable part 48. In some applications, it may be desired to fix the movable part 48 to the stationary part 54. FIG. 6 shows the spring 46 replaced with a sleeve 49 which causes movable part 48 to no longer be displaceable with respect to stationary part 54.

FIG. 9 illustrates a second embodiment of this invention wherein a pair of opposing kneading blades 60' are attached to the second cylinder 52. As in the first embodiment, the kneading blades have axis B—B through leading edge 61 and trailing edge 62, as shown in FIG. 10, in which axis B—B is substantially parallel with the bottom wall 16 of the container 15. Additionally, FIG. 10 of the second embodiment illustrates a convex bottom surface 64 that is off center such that the greatest convexity occurs closer towards the trail edge 62. It will be understood that the convex shape of the bottom surface 64 can be modified in any shape to effect the desired kneading action. Additionally, it may be desirable to add a third or fourth kneading blade wherein more vigorous and concentrated kneading can occur.

This invention has been described in detail with reference to particular embodiments thereof, but it will be understood that various other modifications can be effected within the spirit and scope of this invention.

What is claimed is:

1. An improved pasta maker for preparing fresh pasta and other farinaceous pastes comprising:

a container having a circular shaped bottom wall, a cylindrical shaped side wall perpendicular to and attached to said bottom wall, and an open top side, said side wall, open top side and bottom wall being symmetrical about a vertical axis;

a spindle protruding upwardly through said bottom wall defining said vertical axis, said spindle having a top and bottom end;

a pair of opposed kneading blades attached adjacent to said bottom end of said spindle, said blades positioned on opposing sides of said bottom end and extending radially away from said vertical axis, said kneading blades each having a leading edge and a trailing edge, which are substantially parallel to said bottom wall;

at least one mixing blade attached adjacent to said spindle above said kneading blade and extending radially away from said vertical axis; and a drive means connected to said spindle for spinning said spindle.

2. An apparatus, as claimed in claim 1, wherein:

said leading edge and said trailing edge of each of said kneading blades are interconnected by a lower convex surface.

3. An apparatus, as claimed in claim 2, wherein:

said leading edge and said trailing edge of each of said kneading blades are interconnected by an upper substantially flat surface.

4. Apparatus, as claimed in claim 1, wherein:

said kneading blades and said at least one mixing blade are mounted for reciprocal movement along said spindle; and biasing means on said spindle mounted to bias said kneading blades and said at least one mixing blade toward said bottom wall.

5. An apparatus as claimed in claim 4, further including:

a shaft fixedly mounted on said spindle for rotation therewith;

said at least one mixing blade including a plurality of mixing blades attached perpendicularly to said shaft and extending radially away from said vertical axis;

a cylindrical member mounted on said shaft for rotation therewith and for reciprocal movement therealong, said kneading blades being attached perpendicularly to said cylindrical member and extending radially away from said vertical axis; and said biasing means is mounted between said shaft and said cylindrical member for biasing said cylindrical member toward said bottom wall.

6. An apparatus as claimed in claim 5, wherein:

said biasing means includes a coil spring having a first and second end;

said cylindrical member has a rest engaging one end of said coil spring;

said shaft has a threaded upper end; and a securing nut threadably attached to said threaded upper end of said shaft engaging said second end of said coil spring.

7. An apparatus as claimed in claim 1, further comprising:

an extrusion assembly having:

an extrusion chamber for holding food paste transferred from said container, said chamber having an exit port for extrusion;

an extrusion opening located on the bottom wall of said container and integral with said extrusion chamber for transferring food paste from said container to said extrusion chamber;

an extrusion die fixedly attached to the exit port of said extrusion chamber, said die having a plurality of extrusion holes formed in the cross sectional shape of a desired noodle;

an extrusion screw operatively attached to said drive means for pushing food paste through said extrusion dies to form a desired noodle shape; and a shutter slide operatively attached to said container and coverable over said extrusion opening for selectively controlling transfer of food paste from said container to said extrusion chamber.

8. An improved pasta maker for preparing fresh pasta and other farinaceous pastes comprising:

a container having a circular shaped bottom wall, a cylindrical shaped side wall perpendicular to and attached to said bottom wall, and an open top side, said side wall, open top side and bottom wall being symmetrical about a vertical axis;

a spindle protruding upwardly through said bottom wall defining said vertical axis, said spindle having a top end and a bottom end;

a movable mixing and kneading part attached to said spindle and aligned along said vertical axis, said movable mixing and kneading part comprising:

a first cylinder having a cylindrical shaped central opening;

a second cylinder having a cylindrical shaped central opening, said second cylinder being of larger diameter than said first cylinder wherein said second cylinder is rigidly attached to said first cylinder at an end of said first cylinder and aligned along said vertical axis;

a plurality of kneading blades attached perpendicularly to said second cylinder and extending radially away from said vertical axis, said kneading blades each having a leading edge and trailing edge which are substantially parallel to said bottom wall, said kneading blades further having a convex bottom surface connecting said trail and leading edge; and a plurality of mixing blades attached perpendicularly to said first cylinder and extending radially away from said vertical axis;

a stationary part rigidly attached to said spindle and aligned along said vertical axis, said stationary part movably attached to said movable mixing and kneading part, said stationary part remaining a constant distance from the bottom wall of said container;

a biasing means positioned between said movable mixing and kneading part and said stationary part such that said movable part is displacable in a vertical up and down direction along said spindle shaft, said stationary part remaining immovable in the vertical direction;

a fixing nut threadably attached to said top end of said spindle shaft for retaining said movable part and said stationary part on said spindle shaft; and a drive means operatively attached to said spindle shaft such that said spindle shaft is spun causing said movable part and stationary part to spin.

9. An improved pasta maker for preparing fresh pasta and other farinaceous pastes comprising:

a container having a circular shaped bottom wall, a cylindrical shaped side wall perpendicular to and attached to said bottom wall, and an open top side, said side wall, open top side and bottom wall being symmetrical about a vertical axis;

a spindle protruding upwardly through said bottom wall defining said vertical axis, said spindle having a top end and a bottom end;

a movable mixing and kneading part attached to said spindle and aligned along said vertical axis;

a plurality of kneading blades attached to said movable mixing and kneading part and extending radially away from said vertical axis, each of said kneading blades having a leading edge and trailing edge which are substantially parallel to the bottom wall of said container, said kneading blades further having a convex bottom surface and flat top surface positioned between said leading and trail edge;

a stationary part rigidly attached to said spindle and aligned along said vertical axis, said stationary part movably attached to said movable mixing and kneading part, said scraper part remaining a constant distance from the bottom wall of said container;

a biasing means positioned between said movable mixing and kneading part and said stationary part such that said movable part is displacable in a vertical up and down direction along said spindle shaft, said stationary part remaining immovable in the vertical direction;

a fixing nut threadably attached to said top end of said spindle shaft for retaining said movable part and said stationary part on said spindle shaft; and a drive means operatively attached to said spindle shaft such that said spindle shaft is spun causing said movable part and stationary part to spin.

10. An apparatus as claimed in claim 9, wherein said movable mixing and kneading part further comprises:

a first cylinder having a cylindrical shaped central opening;

a second cylinder having a cylindrical shaped central opening, said second cylinder being of larger diameter than said first cylinder wherein said second cylinder is rigidly attached to said first cylinder at an end of said first cylinder and aligned along said vertical axis;

said plurality of kneading blades attached perpendicularly to said second cylinder and extending radially away from said vertical axis; and a plurality of mixing blades attached perpendicularly to said first cylinder and extending radially away from said vertical axis.

11. An apparatus as claimed in claim 9, wherein said stationary part comprises:

a base section having a top and bottom side;

a shaft section connected to said base section wherein said shaft section and base section are aligned along said vertical axis;

a first flat extending along the vertical length of said shaft section and parallel with said vertical axis;

a second flat alignable with said first flat and extending along the vertical length of said base section parallel with said vertical axis; and a securing nut threadably attached to said top end of said shaft section wherein said movable part is slidable over said stationary part and secured by said securing nut.

12. An apparatus as claimed in claim 9, further comprising:

an extrusion assembly having:

an extrusion chamber for holding food paste transferred from said container, said chamber having an exit port for extrusion;

an extrusion opening located in said bottom wall of said container and integral with said extrusion chamber for transferring food paste from said container to said extrusion chamber;

an extrusion die fixedly attached to the exit port of said extrusion chamber, said die having a plurality of extrusion holes formed in the cross sectional shape of a desired noodle;

an extrusion screw operatively attached to said drive means for pushing food paste through said extrusion dies to form a desired noodle shape; and a shutter slide operatively attached to said container and coverable over said extrusion opening for selectively controlling transfer of food paste from said container to said extrusion chamber.

13. An apparatus, as claimed in claim 12, wherein:

said extrusion chamber is slidably received in said extrusion assembly and is removable therefrom for easy cleaning.

* * * * *